(12) United States Patent
Fazio et al.

(10) Patent No.: US 12,540,664 B2
(45) Date of Patent: Feb. 3, 2026

(54) SPROCKET FOR A LOG STYLE CHAIN

(71) Applicant: SONNY'S ENTERPRISES, LLC, Tamarac, FL (US)

(72) Inventors: Paul Fazio, Plantation, FL (US); Anthony Analetto, Weston, FL (US); David Guzman, Tamarac, FL (US)

(73) Assignee: Sonny's Enterprises, LLC, Tamarac, FL (US)

( * ) Notice: Subject to any disclaimer, the term of this patent is extended or adjusted under 35 U.S.C. 154(b) by 917 days.

(21) Appl. No.: 17/723,862

(22) Filed: Apr. 19, 2022

(65) Prior Publication Data

US 2022/0333675 A1    Oct. 20, 2022

Related U.S. Application Data

(60) Provisional application No. 63/176,559, filed on Apr. 19, 2021.

(51) Int. Cl.
| | |
|---|---|
| *F16H 55/30* | (2006.01) |
| *B65G 19/20* | (2006.01) |
| *B65G 23/06* | (2006.01) |
| *F16G 13/02* | (2006.01) |
| *F16H 55/12* | (2006.01) |
| *B60S 3/00* | (2006.01) |

(52) U.S. Cl.
CPC ........... *F16H 55/303* (2013.01); *B65G 19/20* (2013.01); *B65G 23/06* (2013.01); *F16G 13/02* (2013.01); *F16H 55/12* (2013.01); *F16H 55/30* (2013.01); *B60S 3/004* (2013.01)

(58) Field of Classification Search
CPC ........ F16H 55/12; F16H 55/30; F16H 55/303; F16G 13/02; F16G 13/06; B65G 19/20; B65G 23/06; B60S 3/004
See application file for complete search history.

(56) References Cited

U.S. PATENT DOCUMENTS

| | | | | |
|---|---|---|---|---|
| 2,764,900 | A * | 10/1956 | Warsmith | F16H 55/06 74/460 |
| 4,342,560 | A * | 8/1982 | Ledvina | F16G 13/04 474/213 |
| 5,690,571 | A * | 11/1997 | Mott | F16G 13/04 474/215 |
| 5,921,881 | A * | 7/1999 | Nakamura | F16G 13/06 474/220 |

(Continued)

*Primary Examiner* — Cheng Lin
(74) *Attorney, Agent, or Firm* — Laurence A. Greenberg; Werner H. Stemer; Ralph E. Locher

(57) ABSTRACT

A sprocket is provided for a carrier link chain system which has a chain and a carrier link. The sprocket contains a unitary body which has three shaped sections including a central shaped section and two outer shaped sections sandwiching the central shaped section. The central shaped section has teeth for moving the chain of the carrier link chain. The two outer shaped sections have protrusions extending from a circumference and defines a path through which sides of the carrier link traverse and preventing a side-to-side movement of the carrier link and the chain links. The sprocket prevents jamming issues currently seen when a carrier link twists and causes the chain to jump off of the sprocket or the carrier link gets jammed against other portions of the conveyor system.

20 Claims, 5 Drawing Sheets

(56) References Cited

U.S. PATENT DOCUMENTS

| | | | | |
|---|---|---|---|---|
| 8,038,558 B2* | 10/2011 | Klabisch | ................ | B65G 19/20 |
| | | | | 474/155 |
| 8,221,275 B2* | 7/2012 | Sakura | .................... | F16G 13/06 |
| | | | | 474/213 |
| 9,364,774 B2* | 6/2016 | Endo | .................. | B01D 21/0003 |
| 9,528,588 B2* | 12/2016 | Reiter | .................... | F16H 55/30 |
| 10,001,203 B2 | 6/2018 | Balash et al. | | |
| 10,407,127 B2* | 9/2019 | Sugimoto | ............... | F16H 55/30 |
| 11,858,746 B2* | 1/2024 | Voigt | ...................... | F16H 57/01 |
| 2009/0105024 A1* | 4/2009 | Sakura | .................... | F16G 13/06 |
| | | | | 474/156 |
| 2010/0006808 A1* | 1/2010 | Weingartner | ............ | B66D 3/26 |
| | | | | 254/372 |
| 2017/0037951 A1* | 2/2017 | Balash | .................. | F16H 55/303 |

\* cited by examiner

SPROCKET FOR A LOG STYLE CHAIN

CROSS-REFERENCE TO RELATED APPLICATION

This application claims the priority, under 35 U.S.C. § 119, of U.S. patent Ser. No. 63/176,559, filed Apr. 19, 2021; the prior application is herewith incorporated by reference in its entirety.

BACKGROUND OF THE INVENTION

Field of the Invention

The invention relates to log style chains used in conveyors of automatic carwashes and more specifically to a sprocket for a log style chain.

Log style chains are used for transporting automobiles in and out of automatic carwashes. Disposed within a chain are a plurality of wheel rollers that engage vehicle wheels for conveying automobiles. The chain itself is propelled by a sprocket which engages within a chain link and as the sprocket rotates the chain is moved along. At every nth chain link is a wheel roller that is also pushed along by the sprocket as it is attached to the chain. However, as the wheel roller is pushed a wheel roller forging of the wheel roller and/or the chain links can rotate, pivot, twist and/or move about an axis. This movement of the wheel roller or the chain link can lead to jamming issues currently seen when a wheel roller twists and causes the chain to jump off the sprocket or the wheel roller gets jammed against other portions of the conveyor system.

U.S. patent publication 2017/0037951 to Balash et al. teaches a typical sprocket assembly for moving a chain of a conveyor system of a carwash. The sprocket assembly has a central sprocket frame that holds a plurality of removable teeth that are configured to be readily replaced when the removable teeth become degraded. A motor has a shaft that rotates the sprocket assembly in response to receiving control signals from a motor controller. When the sprocket assembly rotates in a first rotational direction, the removable teeth in the sprocket assembly engage chain links in the chain to move the chain in a predetermined direction. In response to the movement of the chain in the predetermined direction, car wash rollers that are coupled to the chain move along with the chain. Further, the sprocket assembly engages chain links in the chain and rotates in the first rotational direction in response to the movement of the chain. However, the sprocket assembly is not configured to prevent a rotation, twisting, pivoting, or jumping of the chain links or the wheel roller attached to the chain.

There is a need in the marketplace for a sprocket that not only moves the chain but also prevents a rotation, twisting, pivoting and/or jumping of the chain links or jamming of the wheel roller.

SUMMARY OF THE INVENTION

It is accordingly an object of the invention to provide a sprocket for a log style chain which overcomes the above-mentioned disadvantages of the prior art devices of this general type, which is technically easy to implement and is comprised of inexpensive components.

With the foregoing and other objects in view there is provided, in accordance with the invention, a sprocket for a carrier link chain system having a chain with chain links and a carrier link forging. The sprocket includes a body containing three shaped sections including a central shaped section and two outer shaped sections sandwiching the central shaped section. The central shaped section has teeth for moving the chain of the carrier link chain system and the two outer shaped sections have protrusions defining a travel path through which the carrier link forging travels through. Ideally the path is ½-1 inch wide, has a depth of ½-3 inches and is at least ½-3 inches long.

In accordance with an added feature of the invention, the protrusions have inner sides which prevent the carrier link forging and chain links of the chain from deviating from the travel path. Ideally, the projections are partially oval shaped. Optionally, the projections can be triangular shaped with a rounded apex. However we note that other shapes are possible as long as a travel path is provided or defined.

In accordance with another feature of the invention, the two outer shaped sections include a first outer section and a second outer section, and the protrusions on the first outer section are disposed directly opposite the protrusions on the second outer section and define the travel path therebetween.

In accordance with a further feature of the invention, the outer shaped sections each have a ring shaped central frame and the projections extend out from the ring shaped central frame.

In accordance with yet another feature of the invention, the central shaped section has a central frame and the teeth extend out from the central frame. Each of the teeth is disposed between two of the protrusions disposed on one of the two outer shaped sections.

In accordance with an additional feature of the invention, the central shaped section has a taper locking system keyed to match a shaft of a motor for turning the sprocket. Ideally, the taper locking system is disposed on an inner side of the central frame and has a greater width than the central frame. Additionally, the taper locking system has a recess running a full extend of the width of the taper locking system.

In accordance with yet another feature of the invention, the outer shaped sections each have a ring shaped central frame with a first central opening formed therein and the central shaped section has a central frame with a second central opening formed therein. The first central opening has a greater diameter than the second central opening.

In accordance with yet another feature of the invention, the teeth are triangular shaped with a base and a rounded apex point. Ideally, the central shaped section has four teeth and the two outer shaped sections each have four protrusions. Of course, the number of teeth and protrusions is dependent on the size of the chain links used and can be 2, 3, 4, 5, 6, 7 or 8.

In accordance with a concomitant feature of the invention, the body containing the three shaped sections is a unitary part. Ideally, the unitary part is a cast part.

Although the invention is illustrated and described herein as embodied in a sprocket for a log style chain, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
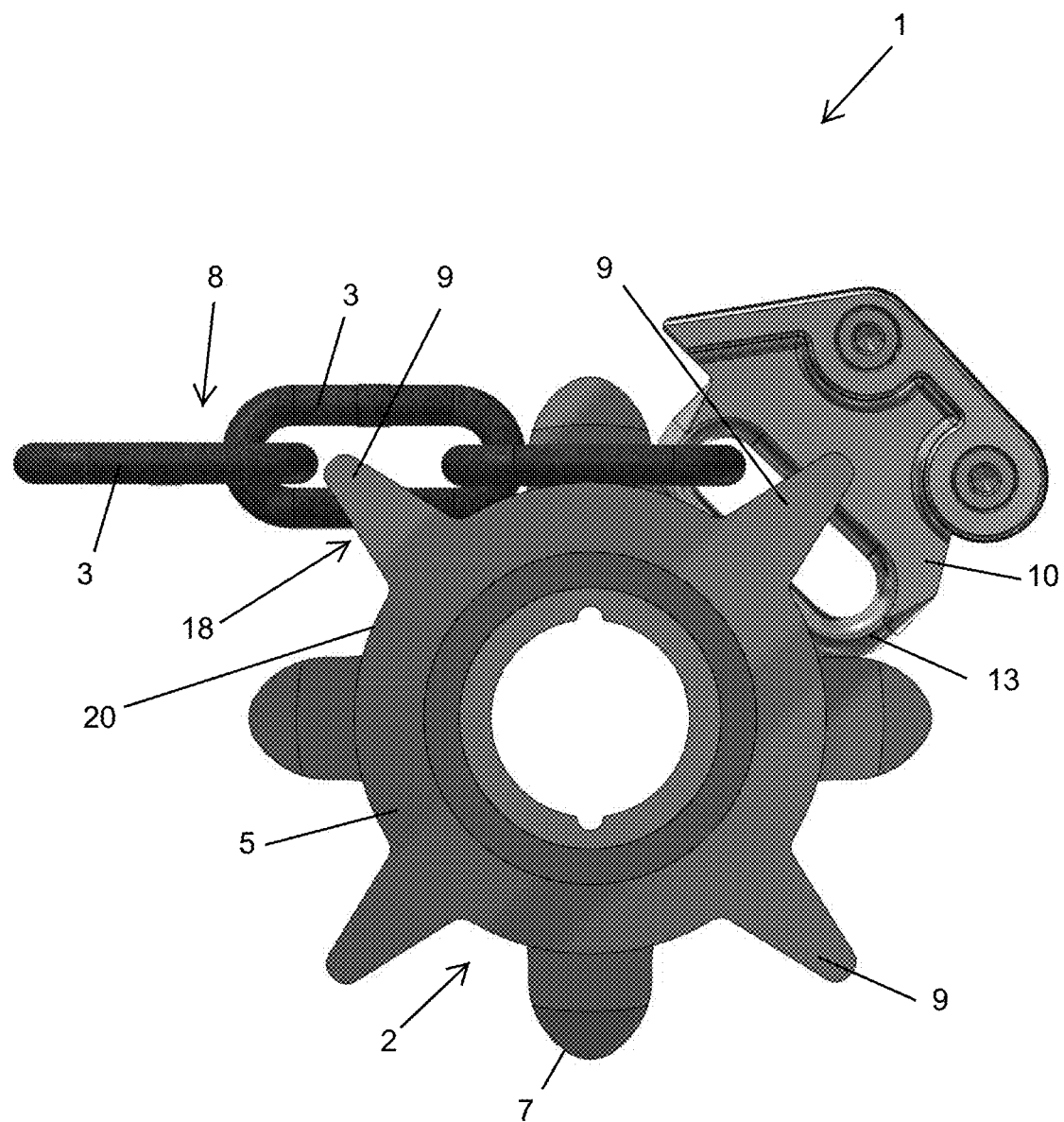
FIG. 1 is a diagrammatic, side view of a log chain system according to the invention.

Referring now to the figures of the drawings in detail and first, particularly to FIG. 1 thereof, there is shown a side-view of a part of a log chain system 1 being part of a conveyor of an automated carwash having a sprocket 2 that is configured to assist in preventing the twisting, rotating, and/or pivoting of the carrier link forging and/or the associated chain.

The log chain system 1 has a chain 8 formed from alternating oval shaped chain links 3, being vertically and horizontally oriented. Attached to every nth chain link 3 is a carrier link forging 10 of a wheel roller assembly for engaging wheels of vehicles for conveying vehicles through a carwash tunnel.

Figure 2:
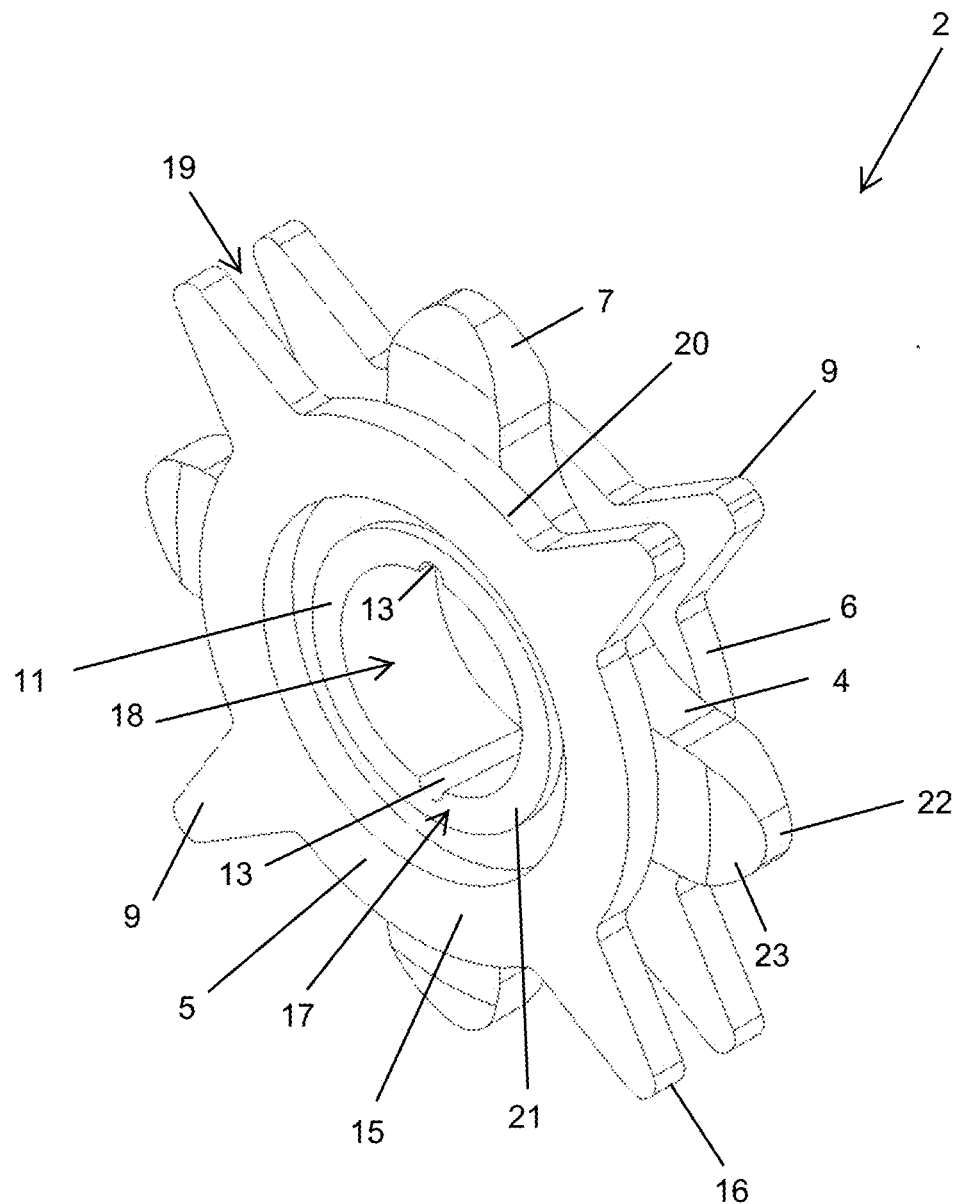
FIG. 2 is a perspective view of a sprocket for the log chain system.
Figure 3:
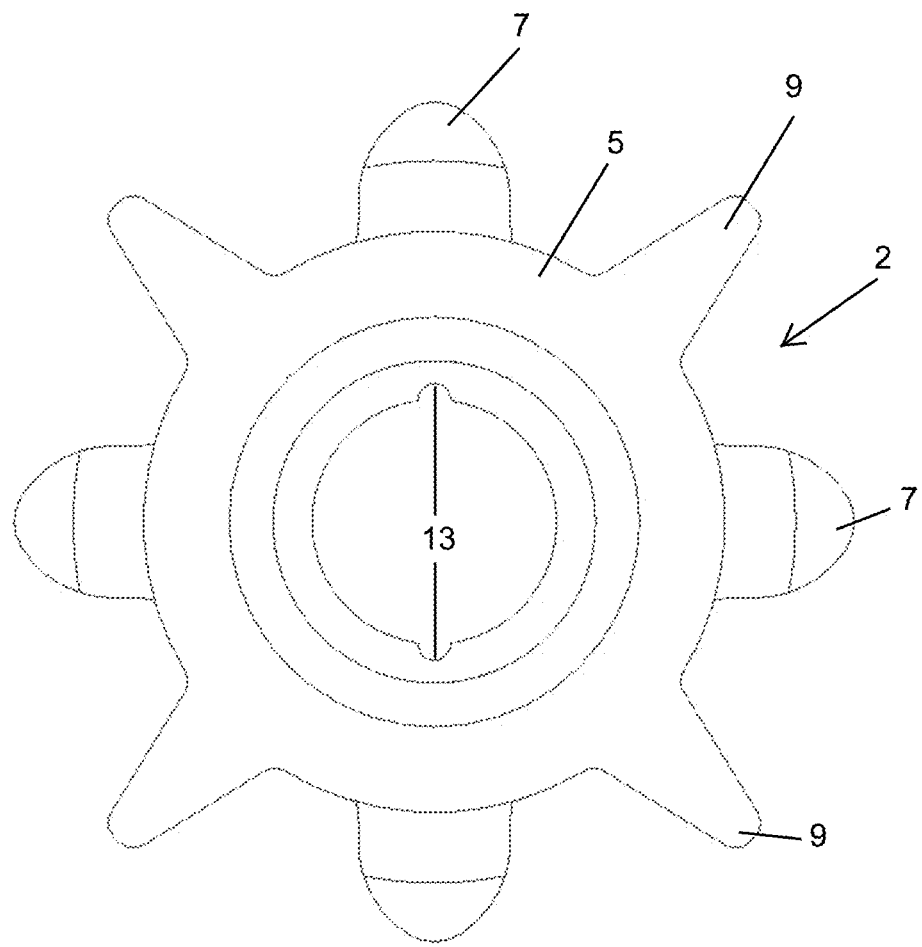
FIG. 3 is a side-view of the sprocket.

As best shown in FIGS. 2 and 3, the sprocket 2 has three shaped sections 4, 5, 6 with different cross-sectional areas and preferably formed as a unitary part. A center shaped section 4 has radially extending teeth 7 that are configured for interlocking with the horizontally oriented chain links 3 of the chain 8 (see FIG. 1). The teeth 7 in the center shaped section 4 pull/push the chain 8 and transmit a torque into a linear motion of the chain 8. The other two shaped sections 5, 6 are on outer sides of the center shaped section 4 and enclose or sandwich the center shaped section 4.

The outer shaped sections 5, 6 are of identical design and each have a ring shaped central frame 15 with a plurality of protrusions 9 disposed around a perimeter or circumference of the ring shaped central frame 15. The protrusions 9 have a generally triangular shape, where the wide base of the triangular shaped protrusions 9 are each supported on the ring shaped central frame 15, and the protrusions 9 extend radially from the ring shaped central frame 15 ending in a rounded triangular tip or apex 16. The ring shaped frames 15 have a central opening 17 leading to a central opening 18 of the center shaped section 4.

The protrusions 9 are provide for supporting both the carrier link forging 10 and the chain links 3. As shown in FIG. 1, the chain links 3 pass between two opposing protrusions 9 which prevent the chain links 3 from twisting or jumping out of position as the sides of the opposing protrusions 9 prevent the chain links 3 from deviating from a given travel path. More specifically, the two opposing protrusions 9 form a pocket 19 through which the chain links 3 traverse. In other words, the opposing inner sides of the protrusions 9 define the given travel path in which the chain links 3 travel and help prevent the chain 8 from jumping away from the teeth 7 of the sprocket 2. In addition, a top surface 20 of the ring shaped central frames 15 define a running path upon which the horizontally oriented chain links 3 pass over and also provide an impact surface for stabilizing a vibrating chain link 3.

As shown in the upper right corner of FIG. 1, the protrusions 9 or the pockets 19 formed by the protrusions also define a travel path for the carrier link forging 10 and prevent the carrier link forging 10 from rotating or shifting side-to-side. More specifically, the protrusions 9 provide a travel path for the carrier link forging 10 to traverse and prevent the carrier link forging 10 from deviating from the travel path. More specifically, the sides of the protrusions 9 engage with the sides of the carrier link forging 10 should there be movement of the carrier link forging 10 that deviate from the given path. In this manner, the carrier link forging 10 is prevented from lifting the chain links 3 off of the protrusions or from jamming into other components.

The sprocket 2 is shown with four protrusions 9 but the number of protrusions 9 depends on a diameter of the sprocket 2 and on a size of the chain links 3. In addition, we note that each tooth 7 is disposed or spaced between a pair of protrusions 9 and that the number of teeth 7 and protrusions 9 are dependent on each other.

The protrusions 9 are illustrated with a triangular shape but of course may be of different shapes as long as the protrusions 9 define a given travel path (e.g. pocket 19) for the carrier link forging 10 and the chain links 3 to traverse. Such different shapes may include round, square, rectangular, star and oval shaped protrusions just to name a few.

The center shaped section 4 has a central frame 11 and the teeth 7 extend from a circumference or periphery of the central frame 11. The central frame 11 of the center shaped section 4 has on an inner side a taper lock system 21 functioning as a locking mechanism for coupling to a shaft. The taper lock system 21 has a number of recesses 13 keyed to match a shaft of a motor. In operation, the shaft of a non-illustrated motor rotates the sprocket 2 in response to receiving control signals from a non-illustrated motor controller. In summary, the shaped sections 4-6 are sized to be compatible with all bore types and attachment methods to the shaft of the motor.

The teeth 7 have a partially oval shape or a round triangular shape. Additionally, toward an apex 22 of the teeth 7, there is a chamfering 23 down towards the apex 22 on both sides of the teeth 7. This chamfering allows the teeth 7 to more easily engage the chain links 3.

The sprocket 2 can be sized for all log chains and especially if they have the "oval" shape chain links 3 with alternating orientation.

The protrusions 9 are designed to support either open C-shaped links 13 of the carrier link forgings 10 or closed loop links of the carrier link forgings 10.

The sprocket 2 is ideally made out of a metal but any material with appropriate strength and durability qualities are appropriate. Ideally, the shaped sections 4-6 are built as a unitary part (e.g. cast), however, the shaped sections 4-6 can be independent parts fitted to one another and/or welded to one another.

Figure 4:
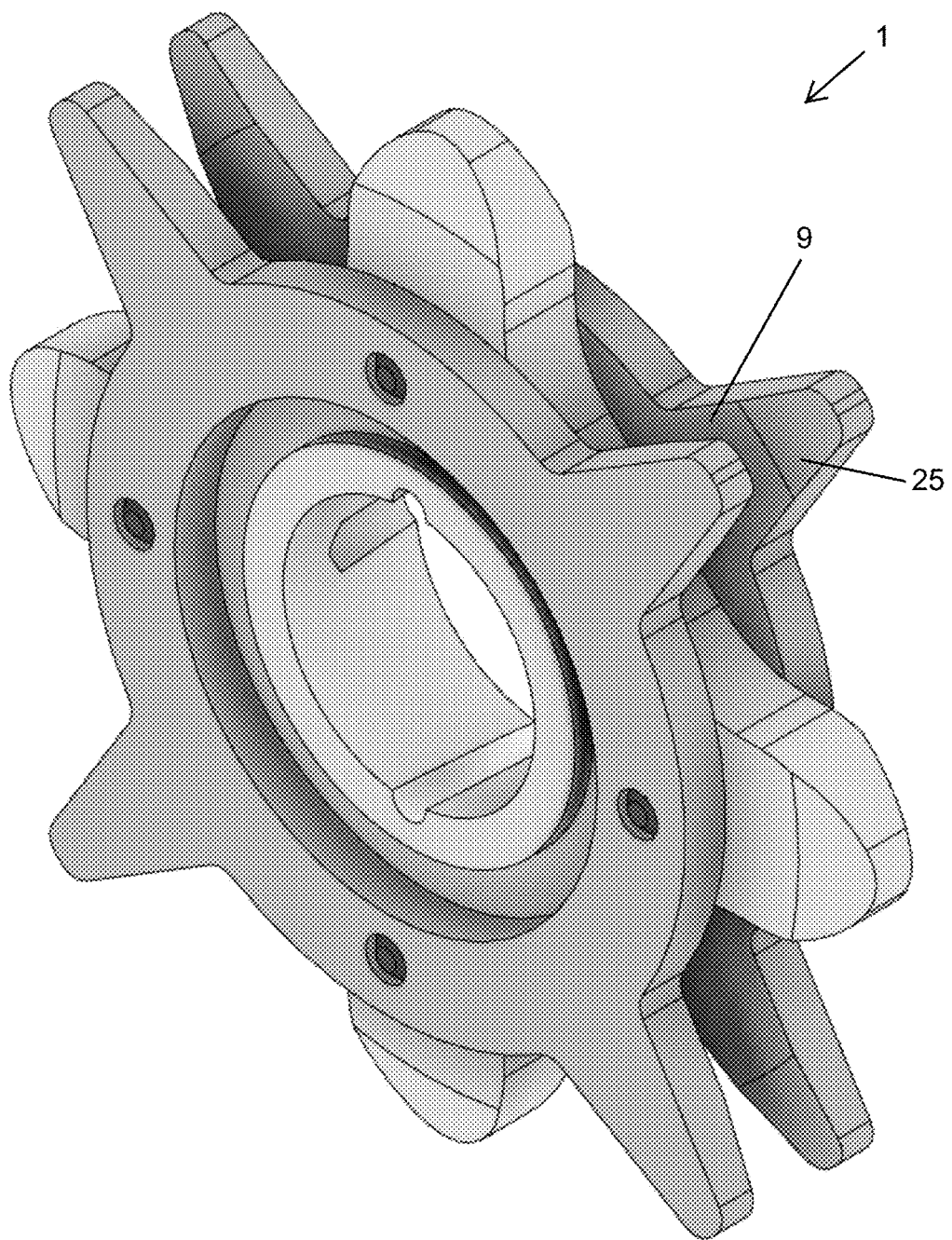
FIG. 4 is a perspective view showing a second embodiment of the log chain system.
Figure 5:
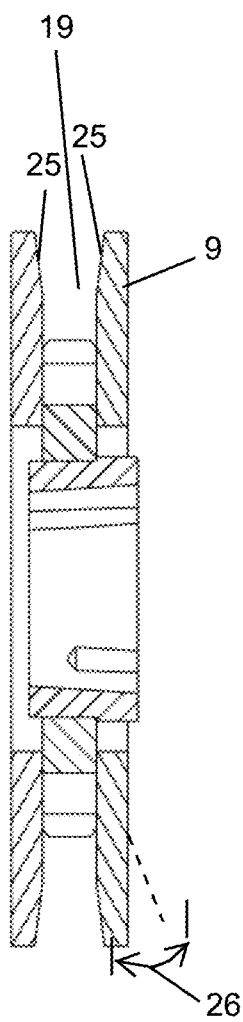
FIG. 5 is a sectional view of the second embodiment.

FIGS. 4 and 5 show a second embodiment of the log chain system 1. In the second embodiment, the protrusion 9 is shown with a chamfer 25 on the inner sides. The chamfer 25 assists in guiding the chain 3 into the pocket 19. In the alternative or additional to the chamfer 25, the protrusions 9 can be angled outward from by an angle 26 of up to 35 degrees. More specifically the protrusions 9 may be angled by a few degrees (1, 2, 3, 4, 5, 6, 7) or up to a steep 35 degrees (e.g. 5, 10, 15, 20, 25, 30 or 35 degrees). The angulation compensates for movement of the chain 3 that is out of alignment.

The invention claimed is:

1. A sprocket for a carrier link chain system having a chain with chain links and a carrier link, the sprocket comprising:
a body containing three shaped sections including a central shaped section and two outer shaped sections sandwiching said central shaped section, said central shaped section having teeth for transmitting a torque of said body to the chain and linearly moving the chain of the carrier link chain system, said two outer shaped sections having protrusions defining a travel path through which the carrier link travels through.

2. The sprocket according to claim 1, wherein said two outer shaped sections include a first outer section and a second outer section, said protrusions on said first outer section are disposed directly opposite said protrusions on said second outer section and define said travel path therebetween.

3. The sprocket according to claim 2, wherein:
said central shaped section has a central frame and said teeth extend out from said central frame;
each of said teeth is disposed between two of said protrusions disposed on one of said two outer shaped sections.

4. The sprocket according to claim 3, wherein said central shaped section has a taper locking system keyed to match a shaft of a motor for turning the sprocket.

5. The sprocket according to claim 4, wherein said taper locking system is disposed on an inner side of said central frame.

6. The sprocket according to claim 5, wherein said taper locking system has a greater width than said central frame.

7. The sprocket according to claim 6, wherein said taper locking system has a recess formed therein running a full extend of said width of said taper locking system.

8. The sprocket according to claim 1, wherein said outer shaped sections each have a ring shaped central frame and said protrusions extend out from said ring shaped central frame.

9. The sprocket according to claim 8, wherein said protrusions are partially oval shaped.

10. The sprocket according to claim 1, wherein:
said outer shaped sections each have a ring shaped central frame with a first central opening formed therein; and
said central shaped section has a central frame with a second central opening formed therein, said first central opening having a greater diameter than said second central opening.

11. The sprocket according to claim 1, wherein said teeth are triangular shaped with a base and a rounded apex point.

12. The sprocket according to claim 1, wherein:
said central shaped section has four teeth; and
said two outer shaped sections each have four protrusions.

13. The sprocket according to claim 1, wherein said body containing said three shaped sections is a unitary part.

14. The sprocket according to claim 13, wherein said unitary part is a cast part.

15. The sprocket according to claim 1, wherein said protrusions having inner sides that are chamfered.

16. The sprocket according to claim 1, wherein at least one of said protrusions is angled relative to a vertical by 1-35 degrees.

17. The sprocket according to claim 1, wherein said protrusions being radially spaced to accommodate a length of a chain link of the chain links in a horizontal orientation between radially adjacent protrusions of said protrusions.

18. A sprocket for a carrier link chain system having a chain with chain links and a carrier link, the sprocket comprising:
a body containing three shaped sections including a central shaped section and two outer shaped sections sandwiching said central shaped section, said central shaped section having teeth for moving the chain of the carrier link chain system, said two outer shaped sections having protrusions defining a travel path through which the carrier link travels through, said protrusions having inner sides which prevent the carrier link and chain links of the chain from deviating from said travel path.

19. A sprocket for a carrier link chain system having a chain with chain links and a carrier link, the sprocket comprising:
a body containing three shaped sections including a central shaped section and two outer shaped sections sandwiching said central shaped section, said central shaped section having teeth for moving the chain of the carrier link chain system, said two outer shaped sections having protrusions defining a travel path through which the carrier link travels through;
said outer shaped sections each having a ring shaped central frame defining top surfaces opposite one another and constructed for supporting a horizontally positioned link disposed on a tooth of said teeth between said top surfaces.

20. The sprocket according to claim 19, wherein said top surfaces provide an impact surface for stabilizing vibrations in the chain link.

* * * * *